Dec. 27, 1949     M. M. MARISIC ET AL     2,492,167
PROCESS OF FORMING ALUMINA-CONTAINING GEL BEADS
Filed Sept. 30, 1944
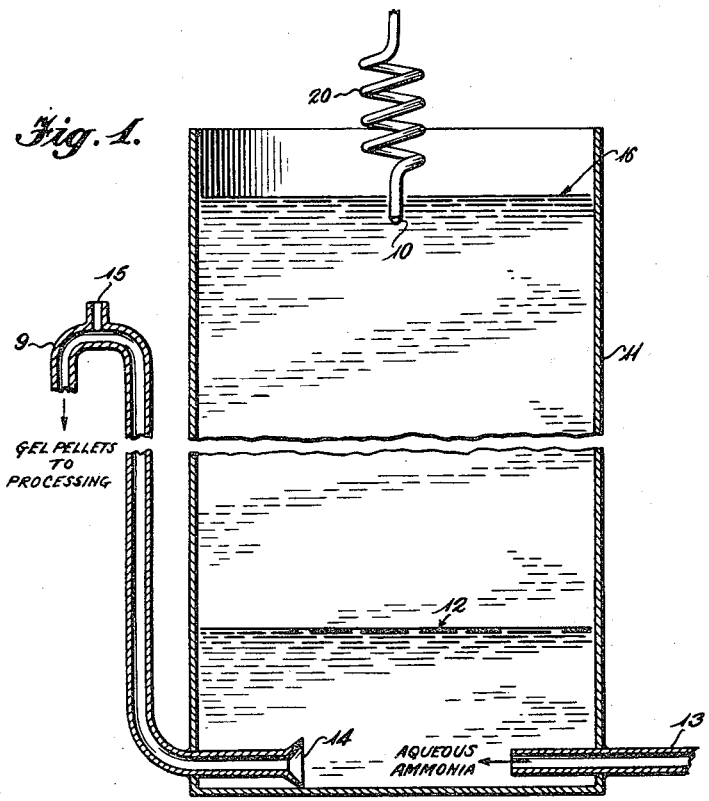
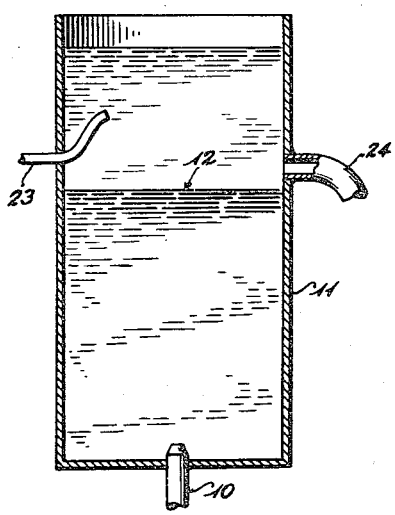
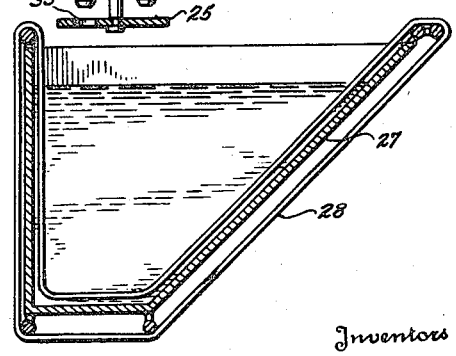

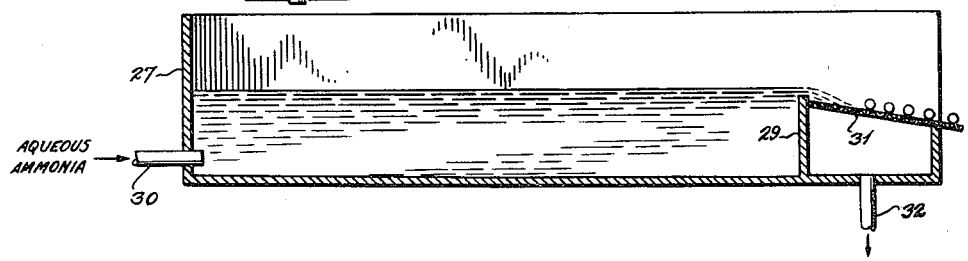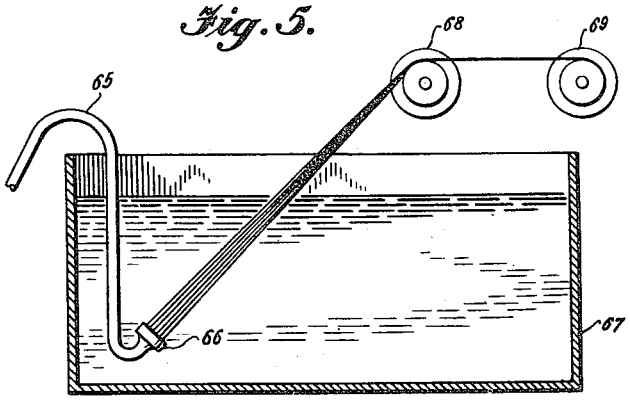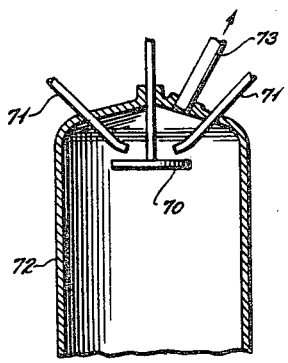

Patented Dec. 27, 1949

2,492,167

UNITED STATES PATENT OFFICE 2,492,167

PROCESS OF FORMING ALUMINA-CONTAINING GEL BEADS

Milton M. Marisic, Northfield, Ill., and Edward M. Griest, Woodbury, N. J., assignors to Socony-Vacuum Oil Company, Incorporated, a corporation of New York Application September 30, 1944, Serial No. 556,633

5 Claims. (Cl. 252—448)

This invention relates to a process for forming hard glassy spheroidal particles of gel containing alumina and to the product so prepared.

In general, the preparation of alumina gels is rather difficult and only a few very specific methods are known whereby this product may be obtained. In this respect, alumina gels differ considerably from silica gels which are quite readily prepared by any one of a number of processes having considerable flexibility. In preparing either a silica or alumina gel, a sol is first formed and the sol is then coagulated to a firm hydrogel. Coagulation may be either an inherent property of the sol, dependent only upon expiration of a period of time characteristic of the composition and temperature of the sol, or gelation may be induced as by dialysis to remove stabilizing electrolytes.

Methods of preparing alumina sols are described in Reissue Patent 22,196 to Heard, and Patent 2,258,099 to Patrick. According to the present invention, an alumina hydrosol prepared in any suitable manner is separated into spherical drops and gelation of the drops is induced by a novel means disclosed herein.

Heard describes in his patent the formation of transparent, glassy alumina gels by the hydrolytic action of dilute acetic acid on metallic aluminum to form a hydrosol which is coagulated to a gelatinous thick mass by mixing with ammonium hydroxide and then the gelatinous precipitate is dried to form the gel.

Patrick discloses formation of hard, transparent and glassy alumina gels by subjecting aluminum metal to the action of an aqueous solution of a weak organic acid capable of forming a readily hydrolyzed soluble salt of aluminum and simultaneously hydrolyzing the aluminum salt to form an alumina sol at a temperature which will preclude gelation of the alumina sol, the acid concentration being controlled so that the solution is substantially free of electrolytes in amount sufficient to coagulate the alumina sol and converting the sol to the gel phase by dehydration.

This invention involves extruding alumina sols into a water-immiscible fluid to form globular particles which are conducted into a coagulating medium to convert them into firm hydrogel pellets having spheroidal shapes and smooth surfaces. The water-immiscible fluid may be any liquid or combination of liquids which is immiscible with water such as, for example, hydrocarbon oils, petroleum naphtha, kerosene, carbon tetrachloride, etc. The coagulating liquid may be any fluid capable of inducing gelation such as, for instance, aqueous solutions of ammonia, ammonium carbonate, ammonia with solutions of inert salts like ammonium nitrate, ammonia with solutions of catalytic materials with which it is desired to impregnate the alumina gel, etc. In general, any alkaline solution containing ammonium ions is suitable for the purpose. The alumina sol may be prepared by the method of Patrick, Heard, or a novel method which involves the hydrolysis of aluminum nitrate solution with ammonia or ammonium carbonate, preferably at an elevated temperature.

An aluminum nitrate solution is converted into an alumina sol by the addition of ammonia or ammonium carbonate at such rate that the alumina precipitate which forms redissolves on rapid agitation. Addition of ammonia is continued only to the point where further addition would result in an insoluble precipitate, which occurs at a pH of about 4.5 to 6, depending upon the concentration of the sol. Since the rate of solution of the alumina precipitate increases with temperature, the preferred temperatures are 50° to 100° C. Alumina sols prepared from aluminum nitrate yield firm hydrogels, which can be handled readily without breakage during the washing and drying operation, when the $Al_2O_3$ content is above five per cent by weight. Less concentrated sols produce soft hydrogels, but this difficulty can be eliminated by concentrating the sols by evaporation prior to conversion into hydrogel pellets. The preferred procedure for preparing the alumina sol of this invention involves neutralizing with ammonium acetate a sol prepared as described above and having a pH of about 4.5. Thus, the sol can be neutralized to about pH 7 without precipitation and at an $Al_2O_3$ concentration of about 8.5 weight per cent. This is not possible when either ammonia or ammonium carbonate are used to form a neutral sol.

In the preparation of catalytic alumina gels containing other oxides, such as $MoO_3$, $V_2O_5$, $Cr_2O_3$, $B_2O_3$, etc., water-soluble salts of the said oxides are added to the sol or are included in the coagulating medium. Thus, for example, boric acid was added to the aluminum nitrate solution and this was converted into hydrogel pellets according to the present invention. These hydrogel pellets were transparent and were harder and firmer than alumina hydrogel beads.

Other objects and advantages of the invention will be apparent from the discussion below of specific embodiments of the invention in connection with the annexed drawings wherein:

Figure 1 is a diagrammatic showing of apparatus for practicing the preferred embodiment of the invention;

Figure 2 is a modification thereof;

Figure 3 illustrates apparatus for forming the pellets by dropping through air to a pool of aqueous ammonia;

Figure 4 is a showing of apparatus for a similar operation wherein the pellets are removed in a current of ammonia;

Figure 5 is a diagrammatic showing of apparatus for spinning the jelly to prepare gel filaments; and Figure 6 is a section through apparatus for spraying the jelly to produce small pellets.

Referring to Figure 1, a nozzle, indicated generally at 10, is mounted at the top of a column of water-immiscible fluid in a tank 11. At the bottom of tank 11 is a layer of aqueous ammonia which forms an interface 12 with the column of said fluid. Ammonia is continuously supplied through inlet 13 and withdrawn through outlet 14. The interface at 12 is maintained by properly adjusting the height of conduit 9 in correlation with the density of the fluid medium and the rate at which ammonia is supplied at 13. Vent 15 prevents siphoning action. The flow of ammonia carries away the gel pellets through outlets 14 and 9 to suitable washing and treating stages.

The colloidal hydrosol from which the pellets are formed is made up and admitted to the column of fluid by the nozzle 10 from a coil 20 and/or storage tank (not shown). Preferably, the apparatus will include a plurality of nozzles 10 in order to increase the capacity of the unit, but only one is shown here for purposes of simplicity. The nozzle 10 is arranged to admit a continuous stream of the sol below the surface 16 of the water-immiscible fluid, wherein the stream of the hydrosol breaks up into globules. The sol or globules thereof may be dropped on the surface of the fluid but this tends to break them and impairs control over pellet size obtained by injecting the sol under the surface of the liquid. It must be borne in mind that considerable shrinkage takes place, not only by syneresis, but also during drying and processing. Control of globule size must take into account this shrinkage.

The size of the globules is controlled by the rate which the sol flows through the nozzle orifice and the dimensions of the latter. A simple modification in controlling the size of the globules is the introduction of a baffle just outside of the nozzle and in the stream of the sol. Furthermore, sizing is a matter of relative densities and viscosities of the sol and water-immiscible liquid.

Another modification that may be applied to the mixing nozzle illustrated in Figure 1, is to provide means for injecting air or any other desired material into the sol and agitating in the nozzle to obtain a uniform dispersion. By this means, hydrogel pellets are obtained which contain numerous small bubbles of air or particles of other desired material such as dried gel, which serve to make the processed dry gel less dense in nature and more porous, or to possess other desirable properties.

The apparatus of Figure 2 is adapted for upward flow of the sol during gelation. In this case, the nozzle 10 is positioned at the bottom of shell 11 which contains a column of water-immiscible liquid heavier than ammonia, with ammonia thereabove, the liquid-liquid interface being again indicated at 12. Ammonia is admitted by a pipe 23 while ammonia carrying gelled spheroids is withdrawn by discharge line 24.

According to the embodiment shown in Figures 3 and 4, the sol is dropped through air, thereby assuming a generally spherical shape, into a pool of ammonia wherein they become gelled. Alternatively, the sol may be dropped through a column containing an atmosphere of gaseous ammonia into a pool of liquid or other suitable means to reduce impact breakage. It is often desirable to introduce mechanical means to break the stream into small portions. Such a modification, also adaptable to and contemplated for the apparatus of Figures 1 and 2, is shown in Figures 3 and 4, wherein a plurality of nozzles 10, of which two are shown, discharge streams downwardly toward discs 25 mounted on rotating shafts 26. The discs 25 are provided with a plurality of openings 33 through which the sol can flow. The sol stream is interrupted at predetermined intervals as the discs 25 rotate to give globules of desired size.

The globules of sol assume generally spherical shape in dropping to a pool of ammonia in vessel 27, which, in Figure 3 is provided with an endless belt 28 to remove formed gel pellets. The belt 28 may suitably run in grooves in the end walls of vessel 27 to cause it to follow the proper course through the vessel.

In the embodiment of Figure 4, gel pellets are removed from vessel 27 in a current of aqueous ammonia flowing over weir 29 and induced by flow through an inlet pipe 30. The current of ammonia flows over the weir onto a screen 31 down which the pellets roll to be processed, while ammonia flows through the screen to a sump from which it is removed by pipe 32 and may be returned to inlet 30, preferably after fortifying by addition of ammonia to maintain the proper concentration. A portion of all of such recycled ammonia may pass through equipment, such as an evaporator, to remove any salts washed out of the sol.

Referring now to Figure 5, the sol may be supplied by a pipe 65 to a spinneret 66 having a plurality of small orifices through which the sol is extruded to a bath of aqueous ammonia in a vessel 67. The bundle of gel filaments so produced are drawn off by any suitable means such as godet 68, similar in construction to those employed in spinning rayon and the like. The bundle of filaments are passed once around godet 68 and then preferably passed to a second godet 69 about which they are also passed once. Godet 69 is preferably driven at a greater peripheral speed than is godet 68, thus stretching the filaments to improve their characteristics by orientation of molecules and molecular aggregates.

The gel filaments may be processed continuously as a yarn or filament bundle, or, as short lengths, processed in batch fashion. According to the latter embodiment, the bundle may be wound in skeins, cut into staple fibers of lengths on the order of 1 to 10 inch s, or formed into woven or knitted articles. For example, a loose rope or belt of the filament may be formed in known manner for the handling of textile fibers, washed, base exchanged when necessary, dried and heat treated to form a catalyst. The flexible rope or belt of catalyst may then be passed through conversion and regeneration zones continuously for catalyzing a desired reaction and regeneration of the catalyst.

Figure 6 shows apparatus for forming very small, rounded pellets of gel by feeding the sol to a rotating disc 70 from inlets 71. The sol is dispersed into the top of column 72 by centrifugal force and an atmosphere of ammonia gas in the column causes gelation of the fine droplets of sol. If desired, ammonia gas may be withdrawn through pipe 13. Fresh ammonia supplied at the bottom of the column may be heated to induce partial drying of the hydrogel, say, to a water content of 50 per cent or less. This will result in water vapor being mixed with the withdrawn ammonia which may then be partially or wholly dehydrated, heated and recycled.

In the preparation of catalytic and adsorptive material it is desirable, in many cases, to composite two or more gels or a gel and a precipitate. We have found that the best procedure for accomplishing this is to prepare the sols separately, mix them and subdivide the sol into small particles and introduce them into a coagulating agent. When a mixture of a gel and a precipitate is desired, the sol and the precipitate are formed separately, composited intimately, divided and coagulated according to our invention. This novel method has many advantages over prior art; particularly, a more uniform product is obtained and in addition in the best possible physical form.

The hydrogel pellets prepared by any of the methods contemplated by the present invention can be washed and dried in the conventional manner to produce catalysts and adsorbents.

Any of the sols described in the specific examples given below may be processed according to any of the alternative methods of forming the gel described above.

EXAMPLE I

Alumina gel

One-hundred eighty grams of glacial acetic acid were diluted with six liters of distilled water; to this solution were added 2.4 grams of mercuric oxide and 120 grams of 12–16 mesh size granules of metallic aluminum. The acid solution was stirred by means of a mechanical mixer and maintained at 75° C. until solution of aluminum was complete. After filtering the resulting alumina sol, it was extruded into a column of n-hexane to form globules of sol, which on entering a layer of aqueous ammonia (sp. gr. 0.90) coagulated to firm, transparent hydrogel beads. After remaining about five minutes in the ammonia layer, the beads were removed, rinsed with distilled water, dried at 180° F. until shrinkage was substantially complete and then gradually heated to 1050° F. The dry beads were hard, transparent and possessed smooth surfaces.

EXAMPLE II

Alumina chromia gel

An alumina sol prepared as described in Example I was extruded into n-hexane to form sol globules, which were conducted into a layer of aqueous ammonia saturated with ammonia chromate. The hydrogel beads, after remaining in the aqueous $NH_3$—$(NH_4)_2CrO_4$ layer for 15 minutes, were removed and dried as in Example I.

EXAMPLE III

Alumina gel

An alumina sol prepared as in Example I was cooled to 5° C. and mixed with 8 normal ammonium acetate in the mixing nozzle in the ratio of 20.0 volumes of sol to 1.00 volume ammonium acetate. The resulting sol was extruded into a column of hexane which was sufficiently long to permit partial gelation of the spheroidal particles prior to entering the ammonia layer. The resulting hydrogel pellets were firmer and had less tendency to fracture on drying than those formed without the addition of ammonium acetate.

The hydrogel beads of this example were dried in an atmosphere of superheated steam at 250–260° F. for a period of two hours and then further dried as in Example I. The dried gel beads were translucent and had hard smooth surfaces.

EXAMPLE IV

Transparent alumina gel from partially neutralized $Al(NO_3)_3$ solution containing boric acid (a) A solution was prepared by dissolving 330 grams $Al(NO_3)_3 \cdot 9H_2O$ and 12.8 grams boric acid in 480 cc. water heated to 90–95° C. and then partially neutralized by the gradual addition of 210 cc. of 14% aqueous ammonia. After concentration to 360 cc., the solution was free of precipitate and had a pH of 4.0.

A portion of this solution was extruded through a column of oil into a layer of concentrated aqueous ammonia (specific gravity = 0.90). On passing through the oil layer the droplets assumed spheroidal shapes which they retained on entering the ammonia layer to form firm transparent hydrogel beads. The beads were washed with 0.1 N $(NH_4)_2CO_3$ until free of nitrate ion, dried by contact with steam at 260–280° F. for 2 hours, then heated overnight to 1000° F. The finished gel was hard and transparent.

(b) To 20 cc. of the solution which had been cooled to 5° C. was added 5.0 cc. 8 normal ammonium acetate with efficient stirring. The resulting hydrosol had a pH of 5.1 and set to a firm clear hydrogel in 30 seconds. The hydrogel was cut up and washed and dried as described for part (a). The gel fragments were hard and transparent.

EXAMPLE V

Alumina gel beads from aluminum nitrate

Three-hundred sixty grams of ammonium carbonate were added slowly with vigorous stirring to 1.35 liters of a solution containing 900 grams of $Al(NO_3)_3 \cdot 9H_2O$, while the temperature was maintained at 90–95° C. This sol was concentrated by evaporation to a volume of one liter. To this hydrosol, which had a pH of 4.8, was added 540 cc. of 8 normal ammonium acetate to raise the pH to 6.4. This hydrosol was extruded into a column of oil to form sol globules which were coagulated to hydrogel on entering a layer of aqueous ammonia (specific gravity 0.90). The alumina hydrogel pellets after remaining in the aqueous ammonia layer for five minutes were removed and washed with 0.20 normal ammonium carbonate until substantially free of nitrate ions. They were dried by contacting with superheated steam at 260–280° F. for two hours, and then heated to 1000° F. in a muffle furnace overnight. The product retained its spheroidal shape and it was hard, glassy, and transparent.

EXAMPLE VI

10% $Cr_2O_3$–90% $Al_2O_3$ gel (weight, per cent on dry basis)

An alumina hydrosol prepared as described in Example I was mixed with a chromic acid solution containing 0.095 gram $Cr_2O_3$ per cc., in the mixing nozzle in the ratio of 300.00 volumes alumina sol to 13.20 volumes of chromic acid to form a plural oxide sol which was extruded into a column of hexane to form globules, which were coagulated to hydrogel pellets on entering an aqueous ammonia solution saturated with ammonium chromate. These hydrogel pellets were dried without washing by contacting with superheated steam at 260-280° F. for two hours, and then gradually heated in a muffle furnace to 1000° F. overnight.

EXAMPLE VII

20% $Cr_2O_3$–80% $Al_2O_3$ gel (weight per cent on dry basis)

The chromia alumina gel beads were prepared in the same manner as described in Example VI by mixing the alumina sol with a chromic acid solution containing 89.6 grams of chromic acid per liter in the ratio of 190.0 volumes of alumina sol to 26.0 volumes of chromic acid solution.

The catalysts of Examples VI and VII were tested for the dehydro-cyclization of n-heptane at 930° F., liquid space velocity of 0.9 cc. n-heptane/hour/gram catalyst, atmospheric pressure and for one-hour run periods. Two prior art catalysts were tested under the same operating conditions for comparative purposes. The results are shown in the table. The catalysts were reduced with $H_2$ for a one-hour period just before the cyclization test.

Table

| Catalyst | Wt. Per cent Aromatics | Wt. Per cent Olefins |
| --- | --- | --- |
| Ex. VI (10% Wt. $Cr_2O_3$ on alumina gel) | 16.5 | 14.8 |
| Ex. VII (20% Wt. $Cr_2O_3$ on Alumina gel) | 40.4 | 15.9 |
| 10% Wt. $Cr_2O_3$ on Activated alumina | 12.5 | 15.9 |
| 27.2% Wt. $Cr_2O_3$ on $Al_2O_3$ preferred catalyst of U. S. Patent 2,236,514 | 18.3 | 15.7 |

EXAMPLE VIII

Alumina-chromium oxide gel 90% $Al_2O_3$, 10% $Cr_2O_3$ (a) A solution containing 300 grams of $Al(NO_3)_3.9H_2O$ and 22.3 grams $Cr(NO_3)_3.9H_2O$ in 500 cc. water was heated to 90°-95° C. and partially neutralized by the dropwise addition of 400 cc. of 14% ammonia. After concentrations to 330 cc. this solution had a pH of 4.0.

A hydrosol having a pH of 6.4, which was formed by the addition of 2.5 cc. of 8 normal ammonium acetate to 20.0 cc. of the partially neutralized aluminum, chromium salt solution, set to a firm, transparent hydrogel on standing overnight. The hydrogel was cut up, washed in dilute ammonium carbonate until free of nitrates, dried by contact with superheated steam at 260-280° F. for 2 hours and then heated to 1000° F. overnight.

(b) To 20.0 cc. of the partially neutralized aluminum, chromium nitrate solution was added with stirring 10.0 cc. of normal ammonium acetate to form a hydrosol which was dropped through a column of oil into a layer of concentrated aqueous ammonia (sp. gr. 0.90). On passing through the oil layer the sol droplets assumed spheroidal shapes which they retained on entering the ammonia layer to form hydrogel beads which were free of precipitate. After standing in the ammonia layer for 15 minutes the beads were removed and washed and dried as in part (a).

EXAMPLE IX

Alumina gel

An aluminum nitrate solution prepared by dissolving 88.2 grams $Al(NO_3)_3.9H_2O$ in 300 cc. of water was heated to 90° C. and partially neutralized to a pH of 5.0 by the intermittent addition of a sodium carbonate solution. After concentration to a strength of 0.12 gram aluminum oxide per cc. the hydrosol was dropped through a column of oil into a layer of concentrated aqueous ammonia. On passing through the oil the sol droplets assumed spheroidal shapes which they retained on entering the ammonia layer to form transparent hydrogel beads. After 5 minutes' immersion in the ammonia the beads were removed, washed with dilute ammonium carbonate, dried at 180° F. until shrinkage was substantially complete, and heated to 1050° F. over a period of 16 hours.

The terms hydrosol and hydrogel, as used herein, are defined as having their proper meaning excluding gelatinous precipitates, often loosely called gels by some authors.

We claim:

1. A process for forming a hydrogel comprising alumina in the form of spheroidal particles having smooth surfaces which comprises injecting a hydrosol containing alumina as the predominating oxide into a body of a water-immiscible liquid above a body of an alkaline solution containing ammonium ions whereby the hydrosol is broken up into a plurality of drops which assume spheroidal shape and pass into said alkaline solution to be coagulated to firm spheroidal hydrogel pellets in said alkaline solution.

2. A process for forming a hydrogel comprising alumina in the form of spheroidal particles having smooth surfaces which comprises injecting a hydrosol containing alumina as the predominating oxide into a body of a water-immiscible liquid above a body of an aqueous solution of ammonia whereby the hydrosol is broken up into a plurality of drops which assume spheroidal shape and pass into said alkaline solution to be coagulated to firm spheroidal hydrogel pellets in said ammonia solution.

3. A process for forming a hydrogel comprising alumina in the form of spheroidal particles having smooth surfaces which comprises injecting a hydrosol containing alumina as the predominating oxide into a body of a water-immiscible liquid above a body of an aqueous solution of ammonium carbonate whereby the hydrosol is broken up into a plurality of drops which assume spheroidal shape and pass into said alkaline solution to be coagulated to firm spheroidal hydrogel pellets in said ammonium carbonate solution.

4. A process for forming a hydrogel comprising alumina and chromia in the form of spheroidal particles having smooth surfaces which comprises injecting a hydrosol containing alumina as the predominating oxide and chromia into a body of a water-immiscible liquid above a body of an alkaline solution containing ammonium ions whereby the hydrosol is broken up into a plurality of drops which assume spheroidal shape and pass into said alkaline solution to be coagulated to firm spheroidal hydrogel pellets in said alkaline solution.

5. A process for forming a hydrogel comprising alumina and chromia in the form of spheroidal particles having smooth surfaces which comprises injecting a hydrosol containing alumina as the predominating oxide and chromia into a body of a water-immiscible liquid above a body of an aqueous solution of ammonia whereby the hydrosol is broken up into a plurality of drops which assume spheroidal shape and pass into said ammonia solution to be coagulated to firm spheroidal hydrogel pellets in said alkaline solution.

MILTON M. MARISIC.
EDWARD M. GRIEST.

REFERENCES CITED

The following references are of record in the file of this patent:

UNITED STATES PATENTS

| Number | Name | Date |
|---|---|---|
| 1,614,636 | Wachtel | Jan. 18, 1927 |
| 2,085,129 | Stoewener | June 29, 1937 |
| 2,098,959 | Frey et al. | Nov. 16, 1937 |
| 2,284,248 | Baker et al. | May 26, 1942 |
| 2,385,217 | Marisic | Sept. 18, 1945 |
| 2,389,378 | Marisic | Nov. 20, 1945 |
| 2,422,499 | Pierce et al. | June 17, 1947 |
| 2,450,394 | Brown et al. | Sept. 28, 1948 |